United States Patent [19]
Beck

[11] 3,794,067
[45] Feb. 26, 1974

[54] SIMPLIFIED VALVE ASSEMBLY
[76] Inventor: Leonard R. Beck, 3602 Meadow Dr., Rolling Meadows, Ill. 60008
[22] Filed: June 7, 1973
[21] Appl. No.: 367,873

Related U.S. Application Data
[62] Division of Ser. No. 258,868, June 1, 1972.

[52] U.S. Cl............. 137/343, 137/612.1, 248/74 A
[51] Int. Cl................................................. F16l 5/00
[58] Field of Search......137/343, 612.1, 248/74 A, 248/316 D, 313; 251/293

[56] References Cited
UNITED STATES PATENTS
| | | | |
|---|---|---|---|
| 2,232,038 | 2/1941 | Stone et al. | 137/343 X |
| 2,927,602 | 3/1960 | Eklund | 137/343 |
| 3,118,463 | 1/1964 | Lacart | 137/343 |
| 3,232,568 | 2/1966 | Lennon et al. | 137/343 X |
| 3,441,047 | 4/1969 | Lyall et al. | 137/343 |
| 3,521,664 | 7/1970 | Medici | 137/343 |
| 3,599,915 | 8/1971 | Soltysik | 248/74 A |
| 3,651,828 | 3/1972 | Lawson | 137/351 |

Primary Examiner—Samuel Scott
Attorney, Agent, or Firm—Darbo, Robertson & Vandenburgh

[57] ABSTRACT

A mounting plate has a clip which holds a valve body and a spring body in spaced positions against the plate. A plunger in the spring body urges an operating lever in a direction such as to bear against the valve stem extending from the valve body. A valve closure is formed by two O-rings on the opposite side of a pressure plate. The valve closure is movable between a position at which one O-ring blocks an air inlet and a second position at which the other O-ring forms a seal about the valve stem.

5 Claims, 5 Drawing Figures

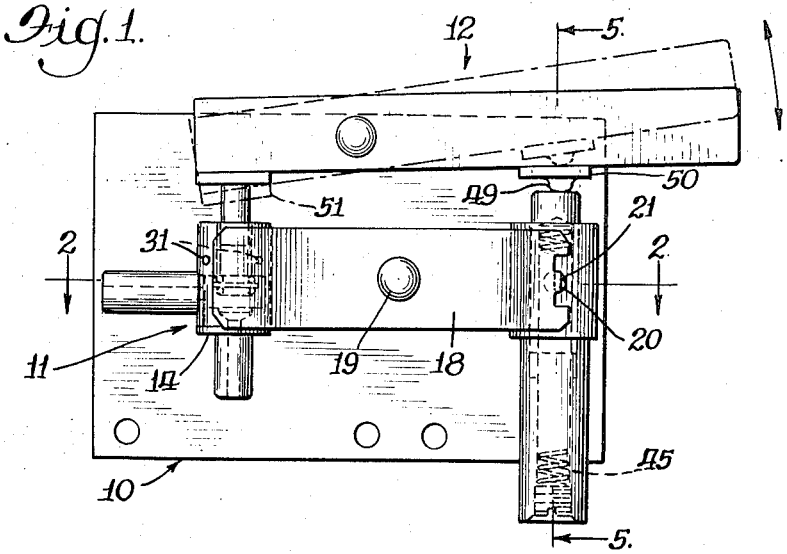
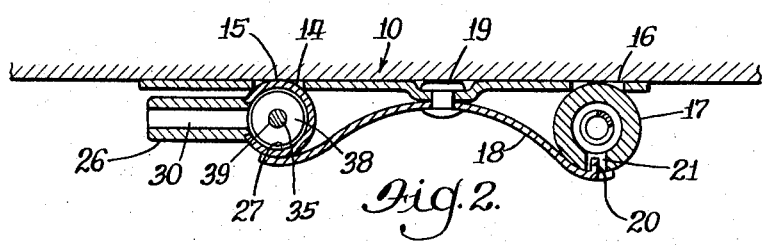
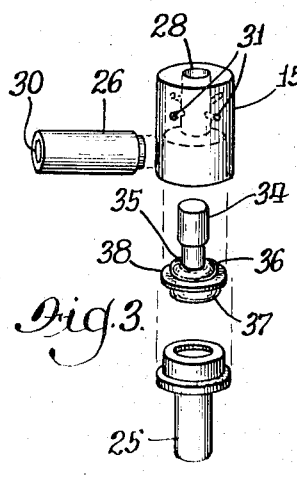
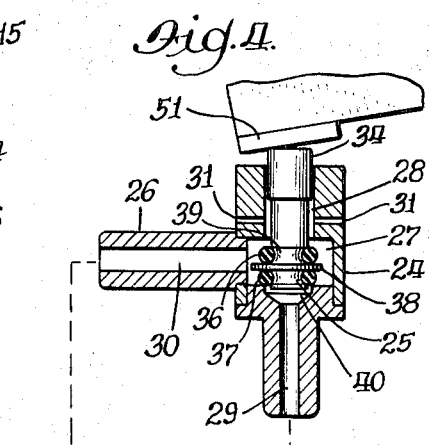
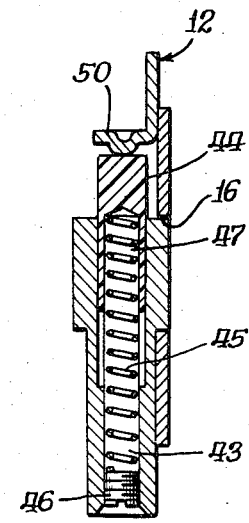

SIMPLIFIED VALVE ASSEMBLY

RELATED APPLICATION

This application is a division of my pending application Ser. No. 258,868, Filed June 1, 1972.

SUMMARY OF THE INVENTION

The present invention relates to a fluid control valve of a character such that it can be simply and inexpensively manufactured, while retaining the accurate control characteristics.

DESCRIPTION OF THE DRAWINGS

FIG. 1 is an elevational view of an embodiment of the invention;

FIG. 2 is a section as seen at line 2—2 of FIG. 1;

FIG. 3 is an exploded view of the valve illustrating the components thereof;

FIG. 4 is a transverse section through the valve; and

FIG. 5 is a section as seen at line 5—5 of FIG. 1.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The illustrated embodiment comprises a mounting plate generally 10, a valve generally 11, an actuating lever generally 12, and a spring assembly generally 13. The plate 10 has a rectangular opening 14 which receives a part of the cylindrical body 15 of the valve 11. A second opening 16 in plate 10 receives a cylindrical part of the spring assembly body 17. A clip 18 secured to the plate 10 by a rivet 19 holds the two bodies seated in their respective openings in the plate. The clip has a finger 20 which extends into an opening 21 in body 17 so as to lock the clip against rotation. The portions of the bodies seated in the openings 14 and 16 hold the bodies against axial movement with respect to the plate. This locking action is perhaps best illustrated by reference to FIG. 5.

The body 15 of valve 11 is essentially made up of three parts, namely, a shell 24, a cap 25 and an arm 26. These are screw machine parts. They are soldered or brazed together. Alternatively, they could be threaded or held together by interference fits. The valve body defines an internal chamber 27. An opening 28 extends along an axis in one direction from this chamber to the exterior. Extending along the same axis in the opposite direction from the chamber is an inlet passageway 29. A passageway 30 extends from the chamber through arm 26. Exhaust ports 31 communicate from opening 28 to the outside of the valve body.

The valve is operated by a valve stem made up of an external portion 34 and an internal portion 35. The external portion 34 is only slightly smaller in diameter than the diameter of opening 28 so that it serves to guide the valve stem for axial movement in a valve body. The internal portion 35 of the stem is significantly smaller in diameter than the diameter of opening 28 so that the two, along with ports 31, define a fluid passageway extending from the chamber 27 to the exterior of the valve body. The valve closure is made up essentially of three elements, namely, an O-ring 36, an O-ring 37 and a pressure plate 38 between the two O-rings. The O-rings 36 and 37 are seated in grooves 39 and 40 respectively. Again, the valve operating member and valve closure, except for the two O-rings, is a screw machine part.

The body 17 of the spring assembly has an internal opening 43 within which is received a plunger 44, a spring 45 and a threaded cap 46. The spring 45 also extends into an open end 47 in plunger 44. The spring urges the plunger outwardly. The amount of force to be exerted can be adjusted by threading the cap inwardly or outwardly in the body, toward or away from the plunger. The plunger 44 bears against a protrusion 49 on an arm 50 of lever 12. The lever has a second arm 51 that bears against end 34 of the valve stem.

The cap 25 forms a connection adapted to be connected to a source of air pressure, for example a hose is clamped onto the outwardly projecting portion of the cap. The arm 26 forms a connection suitable for connecting to a device to be actuated, e.g. a fluid cylinder. The spring assembly 13 normally holds the lever 12 rotated in a counterclockwise position so that the arm 51 of the lever presses the valve stem inwardly and moves the valve closure to the position illustrated in FIG. 4. In this position the incoming air through passageway 29 is shut off by the O-ring 37 bearing against the end wall formed by the end of the cap 25 about the passageway 29 (the center of the O-ring being closed by the end of the valve stem along with plate 38). The plate 38 backs up the O-ring 37 so that the O-ring is squeezed between the plate and said end wall. A good seal is thereby obtained. Through the passageway 30, the chamber 27 and the passageway extending about the valve stem and out through ports 31, the device connected to arm 36 is exhausted. If hydraulic fluid were employed, only a single port 31 would be used and this would extend through a suitable connection to the return for the hydraulic fluid.

When lever 12 is rotated clockwise against the urging of the spring device 13, it relieves the pressure on the valve stem. The force of the air at passageway 29 pushes the valve closure back and plate 38 presses O-ring 36 against the wall of the body about opening 28. This seals off the exhaust passageway. Again, a good seal is obtained by the plate 38 pressing the O-ring against the wall. The air from passageway 29 now is free to move through the chamber 27 and out the passageway 30 to the device to be actuated. When the valve closure is returned to the FIG. 4 position, the device connected to arm 26 promptly exhausts its air through ports 31.

Those skilled in the manufacturing arts will appreciate the simplicity of the components of the apparatus. In the main they can be made on screw machines or are stampings. Alternatively, most of the parts could be molded from plastic. Their assembly is very simple. Thus, the overall construction can be manufactured at a cost that is only a fraction of the cost of manufacturing conventional valves to perform the same purpose.

I claim:

1. A control valve assembly comprising:

a mounting plate having two generally rectangular openings therein;

a valve device comprising a cylindrical valve body having a valve stem extending from one end thereof, said body being seated in one of said openings with the majority of said body extending to one side of said plate with said stem extending in one direction from said one opening;

a spring device comprising a body at least a part of which is cylindrical and is seated in the other of said openings with the majority thereof extending to said one side of the plate, said spring device including a plunger extending in said one direction from said spring device body, and a spring within the spring device body and urging the plunger in said direction;

a clip secured to said plate and bearing against the sides of said bodies that are opposite said plate;

and a lever pivotally attached to said plate and having a portion bearing on said stem and a portion bearing on said plunger.

2. An assembly as set forth in claim 1, wherein said valve device has an air supply connection at the opposite end of the respective body from the stem and axially aligned with the stem, and a closure inside the respective body and secured to the stem and positioned to block off the air flow inwardly from the connection, whereby the force of said air pressure acts to urge the stem in said one direction, said pivotal connection being between said bodies.

3. A valve assembly as set forth in claim 2, wherein said valve device comprises:

said valve body having an internal chamber, a first fluid passageway in the valve body extending along an axis from the exterior of the valve body to said chamber at one wall thereof, a second fluid passageway extending from the exterior of the valve body to said chamber and a valve stem opening extending along said axis from the exterior to said chamber at a second wall thereof, and a valve closure device including a portion normally within said chamber and a valve stem extending therefrom and positioned in said stem opening and movable axially in said opening, said closure device comprising a pressure plate intermediate said portion and generally parallel to said walls, a first resilient O-ring on said portion at one side of said plate, a second resilient O-ring seal on said portion at the other side of said plate, said O-rings having sides adjacent said plate and opposite sides away from said plate, said opposite sides being closer together than the distance between the first and second walls whereby the device is movable along said axis, said O-rings being sufficiently larger in diameter to contact the first wall about the first passageway and to contact the second wall about the opening when the device is moved respectively toward the first passageway sufficiently to bring the one O-ring against the first wall and away from the first wall sufficiently to bring the other O-ring against the second wall, said plate serving to press the O-rings against the respective walls when the O-rings are brought into contacting position.

4. In a valve as set forth in claim 3, wherein the part of said stem adjacent said portion is smaller in dimension transverse to said axis than is the corresponding dimension of the opening in the part thereof adjacent said chamber thereby defining a fluid passage therebetween, said body defining a third fluid passageway extending from said fluid passage to the exterior of the body.

5. In a valve as set forth in claim 4 for use with a source of fluid under pressure and a fluid pressure actuated member, the improvement wherein said body has a first connection communicating with said first passageway and adapted to be connected to said source, said body has a second connection communicating with said second passageway and adapted to be connected to said member, said third passageway forming an exhaust, whereby the fluid from said source acts to urge the closure device away from the first passageway, including means positioned to bear against the part of the stem outside the body to urge the device toward the first passageway.

* * * * *